United States Patent [19]

Cattell et al.

[11] 4,393,755
[45] Jul. 19, 1983

[54] HEAT TREATMENT OF PARTICULATE SOLID MATERIALS

[75] Inventors: Graham S. Cattell, Lingfield; John E. Brittain, Beaconsfield, both of England

[73] Assignee: The A.P.V. Company Limited, Crawley, England

[21] Appl. No.: 234,868

[22] Filed: Feb. 13, 1981

[30] Foreign Application Priority Data

Feb. 15, 1980 [GB] United Kingdom ............... 8005147

[51] Int. Cl.³ ............................................. A47J 27/04
[52] U.S. Cl. .................................... 99/348; 99/355; 366/144; 366/235; 426/478; 426/523; 209/269
[58] Field of Search ............... 366/144, 167, 220, 235; 426/478, 495, 523, 589; 209/260, 268, 269, 273; 99/348

[56] References Cited

U.S. PATENT DOCUMENTS

| | | | |
|---|---|---|---|
| 1,079,207 | 11/1913 | Benjamin | 209/260 |
| 2,496,077 | 1/1950 | Wehner | 209/260 X |
| 3,992,148 | 11/1976 | Shore et al. | 366/147 X |
| 3,993,791 | 11/1976 | Breed et al. | 426/478 X |

*Primary Examiner*—Billy J. Wilhite
*Assistant Examiner*—Christine A. Peterson
*Attorney, Agent, or Firm*—Christel, Bean & Linihan

[57] ABSTRACT

In a batch method for the heat treatment of particular solid material, especially food materials, the vessel in which the heat treatment takes place is essentially a jacketed pressure vessel (1) in which the material is tumbled while being heated, and in order to obtain an increase in throughput the solids and cooking liquor are removed to a second vessel (2) after cooling. In the second tumbling vessel there is a reversible strainer (12) which is used in the position illustrated to separate the liquor from the solids and then inverted after withdrawal of the liquor so that they may be blended with a different liquor, such as a sauce, introduced via a line (14).

4 Claims, 1 Drawing Figure

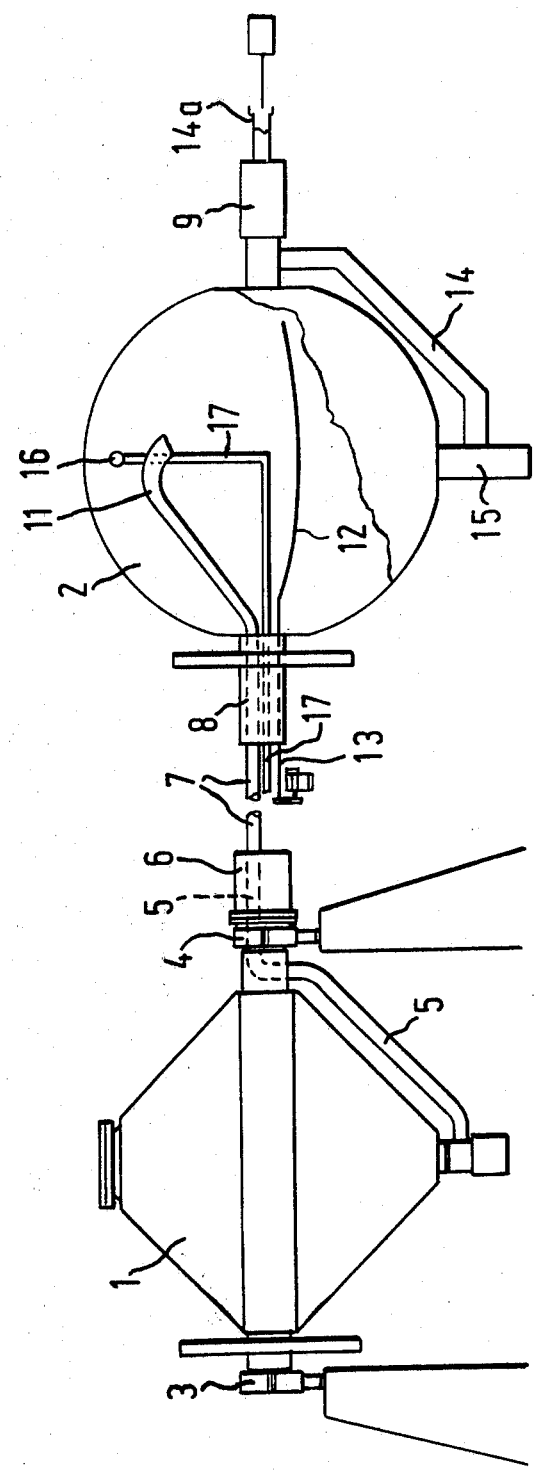

HEAT TREATMENT OF PARTICULATE SOLID MATERIALS

This invention relates to the heat treatment of particulate solid materials, particularly food materials which have to be cooked and sterilized and maintained in sterile condition prior to packaging.

U.S. Pat. No. 3,992,148 describes a batch process of heat treating solid materials in which the treatment is carried out in a rotary vessel adapted to give a tumbling action to the materials as they are heated, primarily by condensation of live steam fed into the interior of the vessel. It is also advantageous, as described in U.S. Pat. No. 4,234,537, to add a lubricant liquid, hot and under pressure, to the materials in the vessel part way through the heating process to reduce damage to the materials under treatment.

After completion of the heat treatment it is frequently desired that some or all of the liquid be separated from the solid phase and this latter then blended with a sauce to produce the final product for packaging, normally canning.

The use of a single vessel for all stages of the processing is the simplest approach and is successful in many instances. However, it has now been discovered that, somewhat surprisingly, this is not always the most economically viable system. If output is to be increased, it has in some cases been found that duplication of the multipurpose vessel is more expensive and less effective than making fuller use of separate vessels for different stages of the process.

In accordance with a first aspect of the invention, there is provided apparatus for the heat treatment of particulate solid material, comprising a heat treatment vessel mounted on hollow trunnions for rotation about a generally horizontal axis and shaped so as to impart tumbling action to the solid material therein as the vessel rotates, the heat treatment vessel having a fluid inlet leading via one of the hollow trunnions, and a discharge outlet for withdrawal of the contents of the vessel via one of the hollow trunnions, and a second rotary vessel for subsequent treatment of the material discharged from the first heat treatment vessel, the second vessel also being mounted on hollow trunnions and being provided with a connection for the supply and discharge of fluid via one of the hollow trunnions and with strainer means for separating the solid particles from the liquid whereby liquid withdrawn from the heat treatment vessel and introduced into the second vessel with the solids may be separated therefrom for discharge via the said connection, the strainer means being adjustable whereby the solids may be mixed with a further liquid introduced via the said connection.

The vessel in which the cooking, i.e. heating and sterilizing takes place has to have a jacket, and also have to be robust enough to withstand the operating pressure involved in maintaining aqueous liquids at sterilizing temperatures without boiling. The second vessel may be of cheaper construction and there is no need to provide a jacket for a vessel in which the steps of separating and mixing takes place. It is preferred that the cooling of the batch takes place in the heating treatment vessel.

The strainer means may for instance be reversible by being mounted for rotation within the second vessel.

According to a second aspect of the invention there is provided a vessel for the treatment of particulate solid material, the vessel being mounted on hollow trunnions providing connections for the ingress and egress of solids and liquids and being so shaped that rotation about the hollow trunnions imparts a tumbling action to the contents of the vessel, in which the vessel also contains a reversible strainer adapted to separate the solids from the liquids passing into the vessel by one connection and so that the liquid may be withdrawn via a second connection, and so to allow the solids subsequently to be withdrawn via the said second connection after further processing.

The said further processing may for instance comprise tumbling with a second liquid.

The invention will be further described with reference to the accompanying drawing, of which the single FIGURE is a diagrammatic illustration of a form of plant incorporating the invention.

The single FIGURE of drawing shows a heat treatment vessel 1 and a separating and blending vessel 2 for carrying out separate stages of a process of heat treatment of successive batches of particulate solid material, particularly food material, which is to be cooked and sterilized in the vessel 1 and then transferred to the vessel 2 for separation from the cooking liquor and addition of and blending with a sterile sauce. It will be appreciated that sterility will be obtained during the heating treatment phase and will be maintained through the subsequent stages of the treatment right up to packaging after discharge from the vessel 2.

The vessel 1 is preferably substantially of the type described in U.S. Pat. No. 3,992,148. The vessel 1 rotates about hollow trunnions 3 and 4 and is so shaped that the contents of the vessel are tumbled by such rotation, and the heating takes place at least partially by the injection of live steam which condenses in the vessel 2 while the latter rotates, the steam being introduced by a line passing through the hollow trunnion 3. As is described in U.S. Pat. No. 4,234,537, hot water may also be injected under pressure during this heating so as to provide additional lubrication for the solid particles, which are thereby protected from damage as they soften during the heat treatment.

The process is more fully described in the specifications already referred to and the contents thereof is to be regarded as imported herein by reference.

After completion of the heat treatment stages, the solid and liquid phases are transferred to a discharge line 5 which connects via a suitable gland 6 to an inlet line 7 to the vessel 2. The vessel 2 is also mounted on hollow trunnions 8 and 9 for rotation about a substantially horizontal axis, and it will be seen that the inlet line 7 passes through the hollow trunnion 8 and connects with an inlet pipe 11 which has a bell mouth and debouches into the upper part of the vessel 2. The vessel 2 also houses a reversible strainer 12 which is connected to a shaft 13 passing through the hollow trunnion 8. The hollow trunnion 9 is connected to a supply and discharge line 14 connected to a supply and discharge connection 15, and the external connection of the line 14 is indicated at 14a. This will be connected by a suitable gland to appropriate pipework. The drawing also shows a spray ball 16 and a connecting pipe 17 which also passes through the hollow trunnion 8 for supply of cleaning and/or sterilizing fluids to the interior of the vessel.

In operation, the heat treatment is carried out in the vessel 1 and after completion of the heat treatment phases, the solids and liquids are discharged from the vessel 1 via the line 5 and passed via the line 7 and pipe 11 into the vessel 2. The solids are trapped by the strainer 12 whereas the liquids pass therethrough and are drawn off via the discharge connection 15 and the discharge line 14.

A sterile sauce, or other second liquid to be mixed with the solids is then introduced via the line 14 and connection 15 and the strainer 12 is reversed so as to allow the solids to be mixed with the newly introduced liquid. The vessel is then rotated about its hollow trunnions 8 to blend the solids and liquid together and the blended product is withdrawn through the opening 15 and line 14. The interior of the vessel and appropriate lines can then be cleaned.

During this separation and blending, the vessel 1 is being prepared and used for a further heating cycle. The liquid separated may be returned for further use in the vessel 1 as the lubricant liquid.

Various modifications may be made within the scope of the invention.

Attention is drawn to our application Ser. No. 06/234,867 filed simultaneously herewith entitled "Heat Treatment of Particulate Solid Materials" and claiming priority from United Kingdom patent application No. 8005182.

We claim:

1. In apparatus for the batchwise heat treatment of particulate solid material, comprising a heat treatment vessel mounted on hollow trunnions for rotation about a generally horizontal axis and shaped so as to impart a tumbling action to the solid material therein as the vessel rotates, the heat treatment vessel having a fluid inlet leading via one of the hollow trunnions, and a discharge outlet for withdrawal of the total solids and liquids contents of the vessel via one of the hollow trunnions; the improvement of a second rotary vessel for subsequent treatment of the material discharged from the said heat treatment vessel, the second rotary vessel also being mounted on hollow trunnions and being provided with a first connection to said discharge outlet of said heat treatment vessel for receiving solids and liquids therefrom and a second connection for the supply and discharge of fluid, each of said connections being via one of the hollow trunnions and with strainer means therein at a location to trap solids as the solids and liquids enter from the heat treatment vessel for separating the solid particles from the liquid whereby liquid withdrawn from the heat treatment vessel and introduced into the second vessel with the solids may be separated therefrom for discharge via said second connection, the strainer means being adjustable whereby the solids may be allowed to drop from the strainer means and mixed by tumbling the second rotary vessel with a further liquid introduced via the said second connection.

2. Apparatus as claimed in claim 1, in which the strainer is reversible.

3. Apparatus as claimed in claim 2, in which the strainer is mounted for rotation within the second vessel.

4. In a vessel for the treatment of particulate solid material, the vessel being mounted on hollow trunnions providing connections for the ingress and egress of solids and liquids and being so shaped that rotation about the hollow trunnions imparts a tumbling action to the contents of the vessel: the improvement that the vessel also contains a reversible strainer at a location and having a first positional state to trap solids as solids and liquids are introduced through one of the said connections and so that the liquid may be withdrawn via a second connection, and so to allow the solids to drop from the strainer to the vessel wall as the strainer is reversed to a second positional state and be mixed by tumbling the vessel with a further liquid introduced via the said second connection and to allow the solids subsequently be withdrawn via the said second connection after said mixing.

* * * * *